United States Patent [19]
Berns et al.

[11] Patent Number: 5,535,653
[45] Date of Patent: Jul. 16, 1996

[54] BAR STOCK SUPPORTING AND FEEDING APPARATUS

[75] Inventors: Joseph F. Berns, Cincinnati; Mark D. Ashbrook, Batavia, both of Ohio

[73] Assignee: J. F. Berns Company, Inc., Cincinnati, Ohio

[21] Appl. No.: 117,630

[22] Filed: Sep. 8, 1993

[51] Int. Cl.[6] .................................................. B23B 13/02
[52] U.S. Cl. .......................... 82/127; 74/110; 414/14; 226/124; 226/154
[58] Field of Search ........................ 82/124, 126, 127; 414/14–20; 226/154, 155, 122, 124, 128, 149, 163; 74/109, 110; 144/209 A

[56] References Cited

U.S. PATENT DOCUMENTS

| | | | |
|---|---|---|---|
| 3,447,694 | 6/1969 | Hartle | 82/126 |
| 4,289,051 | 9/1981 | Ramunas . | |
| 4,628,779 | 12/1986 | Louis | 414/14 |
| 4,995,298 | 2/1991 | Arisaka et al. | 82/127 |
| 5,366,334 | 11/1994 | Cucchi | 82/127 |

*Primary Examiner*—M. Rachuba
*Assistant Examiner*—Kenneth J. Hansen
*Attorney, Agent, or Firm*—Wood, Herron & Evans

[57] ABSTRACT

A bar stock supporting and feeding apparatus which includes first and second series of bar stock support members centered about a longitudinal axis and movable with respect to the axis to rotatably engage a length of bar stock. An adjustable stop mechanism is provided to quickly adjust the apparatus to rotatably support bar stock of different diameter. A loading and unloading mechanism is provided which does not require that an operator's hands be placed dangerously close to the apparatus. A bar stock feeding apparatus is provided with a similar gear system for engaging the bar stock and feeding it into an adjacent machine tool. A fail-safe mechanism prevents disengagement of the support apparatus in the event of a loss of fluid pressure in the system.

58 Claims, 4 Drawing Sheets

BAR STOCK SUPPORTING AND FEEDING APPARATUS

BACKGROUND OF THE INVENTION

The present invention relates to apparatus for centering and rotatably supporting elongated solid or tubular bar stock as well as to apparatus for feeding such bar stock into a machine tool or lathe.

Bar stock support devices have been generally used for supporting a length of bar stock adjacent a machine tool during machining operations. When the bar stock is to be turned in a lathe, means must be provided for rotatably supporting the bar stock as it is being machined. One type of conventional bar stock supporting apparatus includes one or more elongated support tubes which receive and rotatably support the bar stock. Pressurized oil is directed into the space between the bar stock and the inner wall of the support tube, usually in a swirling manner, for lubricating the bar stock as it is rotated at high speed by the lathe.

To accommodate bar stock of different diameters, elongated support tubes of correspondingly different diameters are necessary in the above-described apparatus. This, of course, adds to the overall cost of the apparatus by requiring multiple support tubes and further makes it very cumbersome and expensive to stock enough support tubes to optimally support a wide variety of sizes of bar stock. Certain alternatives have been proposed in the past which include the utilization of replaceable, semicylindrical spacers inside either a plurality of semicylindrical supports or inside a longitudinally split tube. For example, the use of a plurality of semicylindrical supports and inner, replaceable support bushings is illustrated in Arisaka et al. U.S. Pat. No. 4,995,298. Such devices, however, still result in lost production time consumed by installation and adjustment procedures and further result in additional costs due to the manufacture and stocking of a multiplicity of spacers of varying size.

Ramunas U.S. Pat. No. 4,289,051 discloses an apparatus for lifting and centering bar stock so that the bar stock is on the centerline of an adjacent machine tool spindle regardless of the diameter of the bar stock and regardless of the distance which the bar stock is to be lifted. While the apparatus of Ramunas does not require the use of multiple spacers to accommodate bar stock of varying diameter, it has certain other disadvantages. For example, the Ramunas device is a relatively complex and therefore expensive apparatus. Moreover, the Ramunas device is not designed for use with a lathe which rotates the bar stock. Instead, it is designed only to move or translate the bar stock axially into a multispindle machine tool which performs multiple machining operations on the nonrotating piece of bar stock.

Certain other problems exist with prior bar stock supporting and/or feeding apparatus including the problems and hazards associated with loading the bar stock into the apparatus and unloading the bar stock from the apparatus. In the past, these operations have generally required that the operator's hands be placed dangerously close to moving parts of the apparatus. One device for automatically loading bar stock into a feeding mechanism is shown in Hartle U.S. Pat. No. 3,447,694. The device disclosed by Hartle makes use of a generally L-shaped mechanism for loading bar stock into a feed apparatus. One of the drawbacks of the Hartle device, however, is that it provides no mechanism for unloading the bar stock from the feed apparatus and thus, if an operator desires to unload the bar stock from the feed apparatus, the operator's hands must be placed into the feed apparatus therefore risking injury. Ramunas U.S. Pat. No. 4,289,051 also discloses a bar stock loading mechanism but, like Hartle, fails to provide any means for safely unloading the bar stock from the feed apparatus.

SUMMARY OF THE INVENTION

It has therefore been one object of the invention to provide a bar stock supporting and centering mechanism which is infinitely adjustable over any predetermined range to optimally support bar stock of varying diameter within that range.

It has been another object of the present invention to provide a very simple mechanism for adjusting the bar stock supporting and centering mechanism to the specific size of bar stock to be machined by an adjacent machine tool.

It has been yet another object of the invention to provide a bar stock supporting and centering mechanism which not only centers the bar stock on the axis of an adjacent lathe but rotatably supports the bar stock during the machining operation.

It has been a further object of the invention to provide a bar stock feeding mechanism which preferably operates in conjunction with the supporting and centering mechanism of the invention to feed the bar stock into the machine tool before the machining operation begins.

It has been still a further object of the invention to provide a mechanism for both loading and unloading bar stock from the supporting and centering and the feeding mechanism without requiring that the operator's hands be placed dangerously close to moving parts of the mechanisms.

It has been still another object of the invention to operate the feed apparatus by means of fluid power such as air pressure and to provide a fail-safe mechanism for preventing disengagement of the bar stock upon a loss of fluid pressure in the operating system during a machining operation.

It has been still a further object to provide an easily manufactured housing for fully enclosing the supporting and centering mechanism as well as the feeding mechanism such that lubricants and/or coolants may be applied therein without significant mess.

These and other objects and advantages are achieved by the bar stock supporting, centering and feeding apparatus of the present invention which includes upper and lower elongated support rails each having a plurality of bar stock support blocks or bearing members attached at spaced locations along opposed surfaces of the rails. The support rails are movable both toward and away from one another so as to allow rotatable supporting engagement and disengagement of a length of bar stock disposed between the support blocks or members of each rail. An easily adjustable stop mechanism is provided to accurately position the upper and lower rails and their respective support blocks with respect to one another according to the specific diameter of bar stock to be fed into an adjacent machine tool. More specifically, in the preferred embodiment the stop mechanism includes a replaceable gauge block which is sized to have a specific length which depends on the diameter of the bar stock to be fed into the adjacent machine tool. The gauge block may be quickly removed and replaced with a gauge block of different length to reset the supporting and centering mechanism to rotatably support bar stock of a different diameter.

The bar stock supporting and centering mechanism centers and rotatably supports the bar stock between the support blocks through movement of the support rails toward one another preferably achieved by a multiple rack and pinion gear system. More particularly, the gear system includes an elongated horizontal rack operatively connected to a plurality of gear boxes which translate back and forth movements of the elongated horizontal rack into opposed vertical movements of the support rails both toward and away from one another. The adjustable stop mechanism engages the elongated horizontal rack to stop its movement during both inward and outward movement of the support rails with respect to each other to thereby either respectively engage or disengage the bar stock.

The apparatus of the invention is provided with a loading and unloading mechanism which includes a plurality of at least two levers which are pivotally mounted adjacent the bar stock supporting and centering mechanism and/or the feeding mechanism. Each of these levers include upturned portions or lips at opposite ends thereof. One lip of each lever extends between the bar stock support rails while the opposite lip of each lever is spaced a safe distance from any moving parts of the supporting and centering mechanism or feeding mechanism of the apparatus. Preferably, the levers extend out of a lengthwise hole in the side of an elongated tubular housing which fully contains the supporting and centering mechanism as well as the feeding mechanism. Pivoting of the levers toward the apparatus therefore loads a piece of bar stock into the housing and between the support rails while pivoting of the levers away from the apparatus unloads the bar stock from the housing. The loading and unloading mechanism thus allows the operator's hands to be kept at a safe distance from moving parts of the apparatus during both loading and unloading operations.

The bar stock feeding mechanism of the apparatus is disposed at the end of the bar stock supporting and centering mechanism adjacent the machine tool. The feeding mechanism feeds the rotatably supported and centered bar stock into the machine tool before a machining process begins. The feeding mechanism comprises at least two and preferably four feed rollers disposed on opposite sides of the bar stock and includes means for moving the rollers toward the bar stock for engagement therewith and also away from the bar stock for disengagement therefrom. The rollers are driven, for example, by at least one and preferably two reversible hydraulic motors for both feeding the bar stock into the machine tool and withdrawing the bar stock from the machine tool.

The apparatus of the present invention further includes a fail-safe mechanism operable to prevent the two support rails and their respective bar stock support blocks from disengaging from the bar stock during a machining operation should there be a loss of fluid pressure to the cylinder or cylinders which control their inward and outward movement. More particularly, the fail-safe mechanism includes at least one and preferably more than one cylinder operating off the same source of fluid pressure as a cylinder or cylinders which control the inward and outward movement of the support rails. The cylinders of the fail-safe mechanism are operatively connected to toothed members which are normally held by the piston rod or other movable element of the cylinder in a retracted state. In this retracted position the toothed members are spaced from the elongated horizontal rack of the supporting and centering mechanism as long as there is sufficient fluid pressure in the system. Upon a loss of fluid pressure, however, one or more springs bearing against the toothed members cause the toothed members to engage the horizontal rack thereby stopping its movement and preventing disengagement of the bar stock from the support blocks.

These and other objects and advantages of the invention will become more readily apparent upon review of the following detailed description of a preferred embodiment of the invention taken in conjunction with the accompanying drawings.

GENERAL ORGANIZATION

Figure 1:
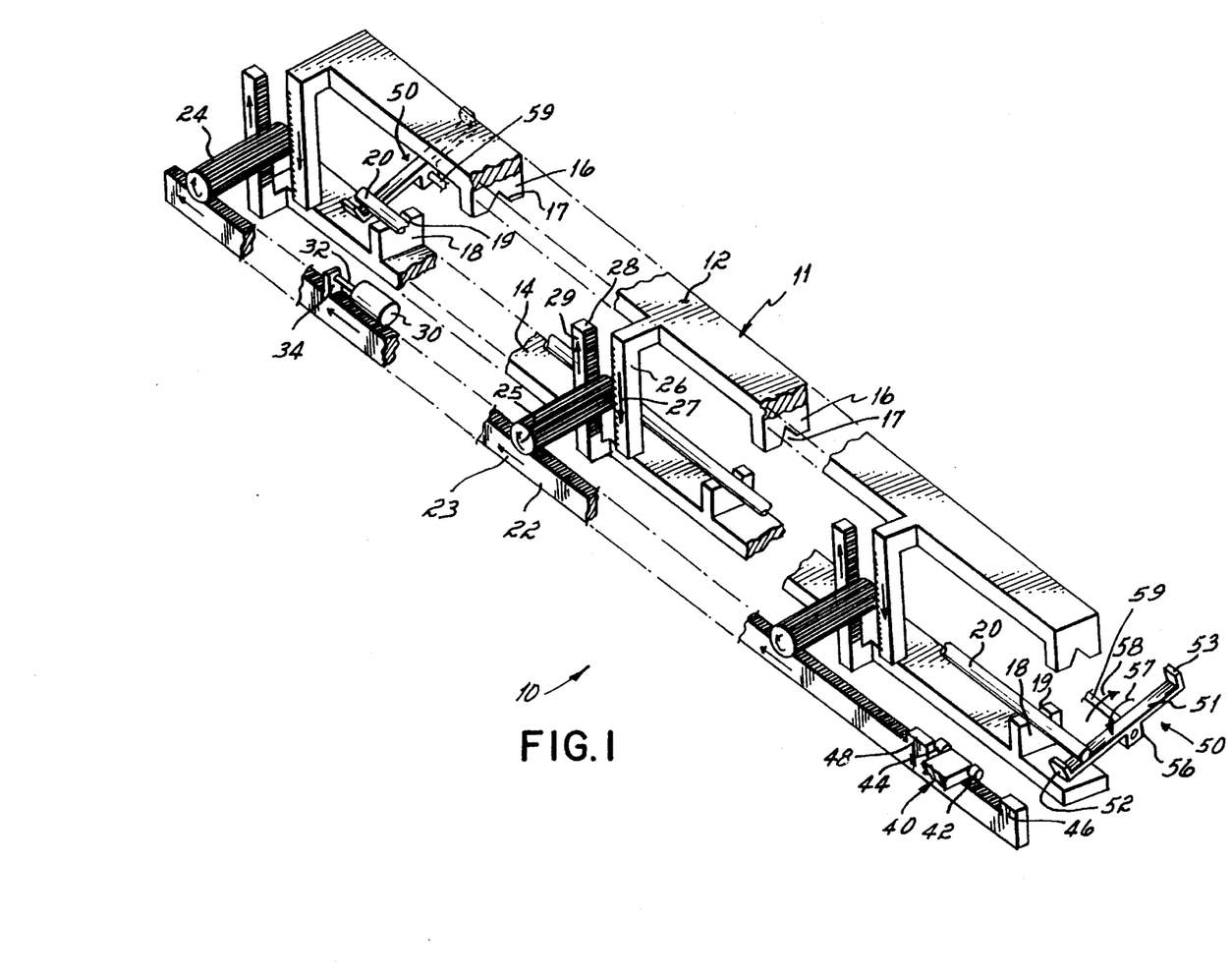
FIG. 1 is a diagrammatic rear perspective view of an apparatus constructed in accordance with the present invention and specifically showing major components of the bar stock supporting and centering mechanism.

FIG. 1 diagrammatically illustrates the bar stock supporting and centering mechanism 11 of the invention including an upper support rail 12 and a lower support rail 14. The upper support rail 12 includes a plurality of spaced bar stock support blocks 16 each having a "V"-shaped recess 17. Likewise, the lower support rail 14 includes a plurality of bar stock support blocks 18 each having a "V"-shaped recess 19. The bar stock support blocks 16 of the upper frame member 12 are rigidly secured thereto with the "V"-shaped recesses 17 in opposed but longitudinally staggered relation to the "V"-shaped recesses 19 of the bar stock support blocks 18 secured to the lower support rail 14. The longitudinally offset or staggered relation of the respective bar stock support blocks 16, 18 provides infinite adjustment between the two sets of support blocks 16, 18 over a predetermined range. The "V"-shaped recesses 17, 19 of the opposed, longitudinally offset or staggered support blocks 16, 18 are centered about or, in other words, equidistant from an axis 21 (FIG. 2) which is at least substantially if not exactly the same axis as the turning axis of the machine tool 115. When the upper and lower support rails 12, 14 are simultaneously moved toward one another at the same rate, in a manner to be discussed further below, the upper support blocks 16 will move in between the lower support blocks 18 and vice versa to allow supporting and centering of extremely small diameter bar stock 20. As will also be discussed further below, when a length of bar stock 20 is initially loaded between the upper and lower support rails 12, 14, it rests in the recesses 19 of the lower support blocks 18 as shown in FIG. 1. Then, the lower support rail 14 is raised and the upper support rail 12 is simultaneously lowered until the bar stock 20 is substantially centered, that is, until the inner side surfaces of the upper "V"-shaped recesses 17 are about 1–2 mm from the upper surface of the bar stock 20.

The bar stock supporting and centering mechanism 11 further includes an elongated horizontal rack 22 which engages a plurality of pinions 24. Each of the pinions 24 is in engagement with two vertical racks 26, 28 on opposed diametrical surfaces thereof. Thus, movement of the elongated horizontal rack 22, for example, in the direction of arrow 23 causes rotation of the pinion 24 in the direction of arrow 25 and thereby causes opposed vertical movement of each of the vertical racks 26, 28 in directions represented respectively by arrows 27, 29. Each vertical rack 26 is rigidly secured to the upper support rail 12 and each vertical rack 28 is rigidly secured to the lower support rail 12. Therefore, the above-described movement of the elongated horizontal rack 22 in the direction of arrow 23 causes simultaneous movement of the support rails 12, 14 towards one another such that the support blocks 16, 18 center the length of bar stock 20 and engage and rotatably support the bar stock 20 therebetween. Means are also provided for moving the elongated horizontal rack 22 back and forth. Preferably, one or more double-acting pneumatic cylinders 30 are provided for causing the back and forth movement of the elongated horizontal rack 22. These double-acting cylinders 30 are rigidly secured to stationary mountings (not shown) and, for example, include a piston rod 32 which is extended and retracted by air pressure within the cylinder 30. The outer end of the rod 32 is rigidly secured to a bracket 34 fixed to the elongated horizontal rack 22.

An adjustable stop mechanism 40 limits the movement of the elongated horizontal rack 22 in both directions of its movement. The adjustable stop mechanism 40 is rigidly mounted to the apparatus 10 such that it is stationary with respect to the elongated horizontal rack 22. The stop mechanism 40 includes a pair of gauge blocks 42, 44 on opposite sides thereof for engaging a pair of stops 46, 48 extending upwardly from the elongated horizontal rack 22. As detailed below, gauge block 42 is adjustable, for example, by being removably attached to the stop mechanism 40 and replaceable by gauge blocks of various lengths which have a corresponding relationship to the various diameters of bar stock 20 receivable by the bar stock supporting and centering mechanism 11 as will be further described below.

As further shown in FIG. 1, the bar stock supporting, centering and feeding apparatus 10 includes a bar stock loading and unloading mechanism 50. The bar stock loading and unloading mechanism 50 includes at least two pivotally mounted levers 51 having upturned portions or lips 52, 53 at opposite ends thereof for maintaining the bar stock 20 on the levers 51 and for engaging the length of bar stock 20 during loading and unloading operations. Each lever 51 includes a central pivot mount 56 for allowing the lever to be pivoted in the directions indicated by arrows 57 and 58 by an actuator or actuators (not shown) coupled to, for example, an outer end of at least one lever 51. Pivoting of the pair of levers 51 in the direction indicated by arrow 57 loads a length of bar stock 20 onto lower support blocks 18 while pivoting in the direction indicated by arrow 58 unloads the length of bar stock 20 from the lower support blocks 18 into a position in which it rests against the lips 53 which are spaced a safe distance away from the supporting and centering mechanism 11.

Figure 2:
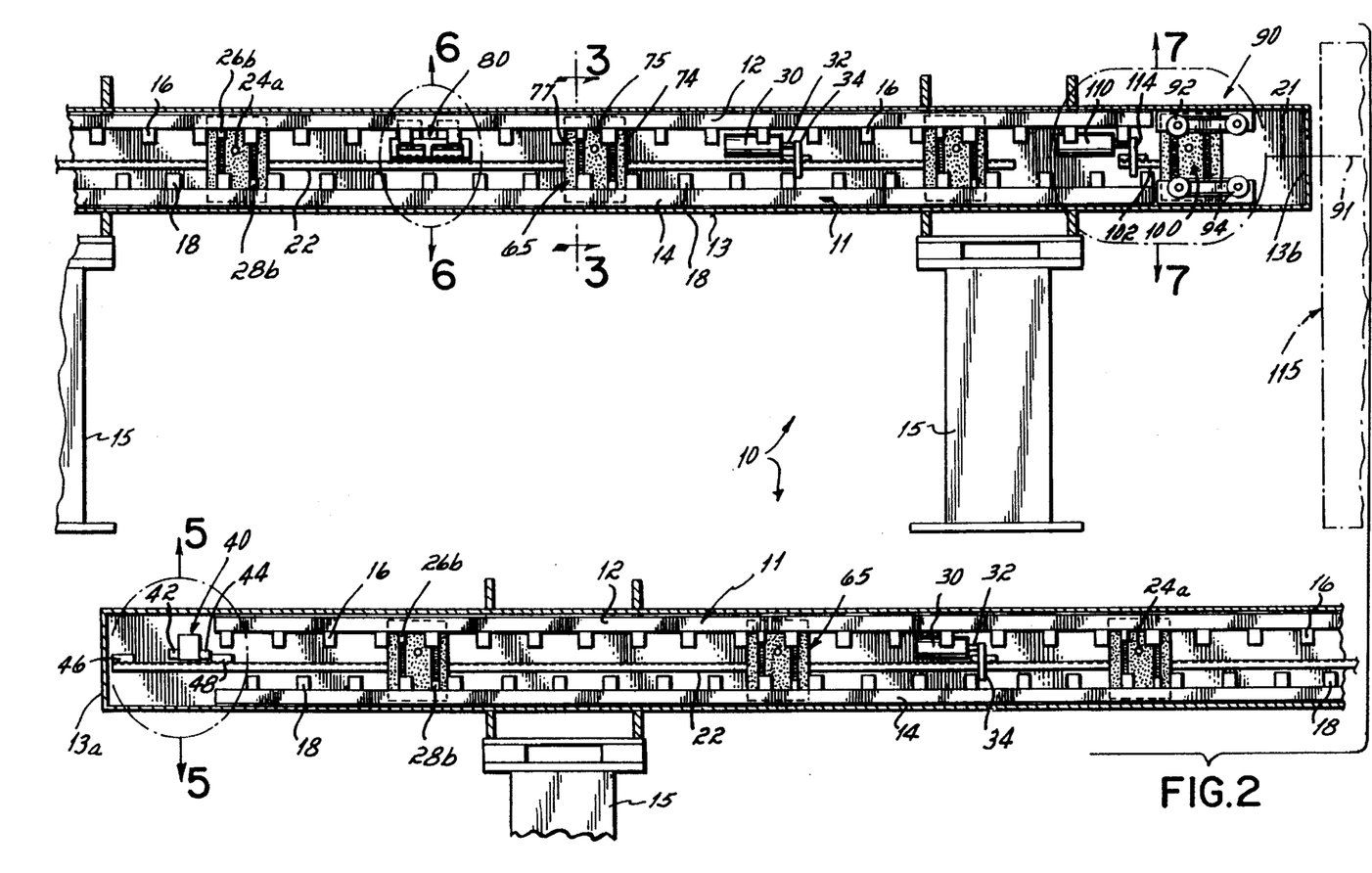
FIG. 2 is a front view of the supporting, centering and feeding apparatus with the housing thereof in cross-section and showing the bar stock centering mechanism as well as the bar stock feeding mechanism disposed therein.

At least one fail-safe mechanism 80 is further provided as illustrated at the top of FIG. 2 to prevent movement of the elongated horizontal rack 22 in the event of a loss of fluid pressure to the cylinders 30. As detailed below, the fail-safe mechanism 80 prevents the support rails 12, 14 from moving apart during a machining operation if there is a loss of fluid pressure for any reason.

As shown in FIG. 2, the apparatus 10 further includes a bar stock feeding mechanism 90 disposed within the housing 13 proximate an end opening 13b therein. The bar stock feeding mechanism generally comprises a pair of upper feed rollers 92 and a pair of lower feed rollers 94 which are movable toward and away from one another by a rack and pinion gearbox 100 designed very similarly to the gearboxes 65 of the bar stock centering mechanism 11. As will be further explained with reference to FIG. 7 below, the bar stock feeding mechanism 90 engages and moves the length of bar stock 20 along axis 21 which is substantially if not exactly identical to the turning axis 91 of the lathe or machine tool 115.

Figure 3:
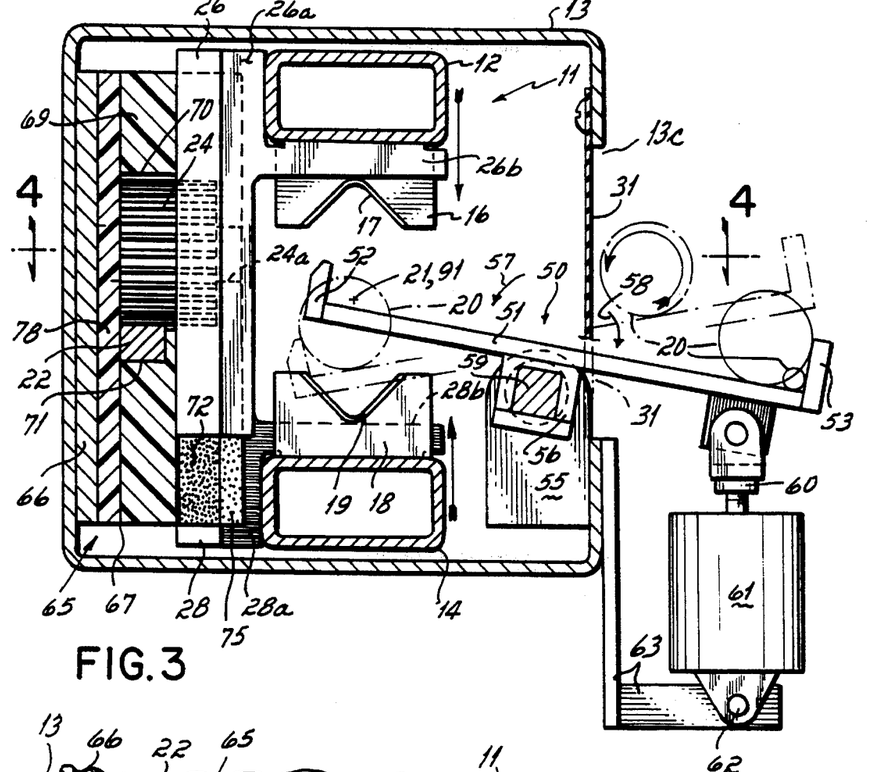
FIG. 3 is a cross-sectional view taken along line 3—3 of FIG. 2.

As illustrated in FIG. 2, both the bar stock centering mechanism 11 and the feeding mechanism 90 are fully contained within an elongate housing 13 preferably having a square cross-sectional shape which is best illustrated in FIG. 3. The housing 13 is advantageously formed from a tube made of ¼ thick steel and having a first closed end 13a and a second end having an opening 13b therein for allowing passage of the bar stock 20 into the lathe or machine tool 115 as shown in FIG. 2. As further shown in FIG. 3, one longitudinal side of the housing 13 includes a lengthwise opening 13c which is long enough to receive the entire desired length of bar stock 20 therethrough. A flexible flap 31 formed, for example, of neoprene rubber is secured along the inner top edge of the opening 13c to allow, for example, spray application of lubricants and/or coolants within the housing 13 during a machining operation without significant mess. The flap 31 may be lifted out of the way and, for example, temporarily rested or attached on the top of housing 13 during the loading and unloading of bar stock 20 from the apparatus 10. The housing 13 as well as the bar stock centering mechanism 11 contained therein may be formed of any desired length, however, standard lengths are anticipated to accommodate 12', 24' and 36' lengths of bar stock 20. The housing 13 is held at the correct height with respect to the machine tool or lathe by vertical supports 15.

Bar Stock Supporting and Centering Mechanism

Figure 4:
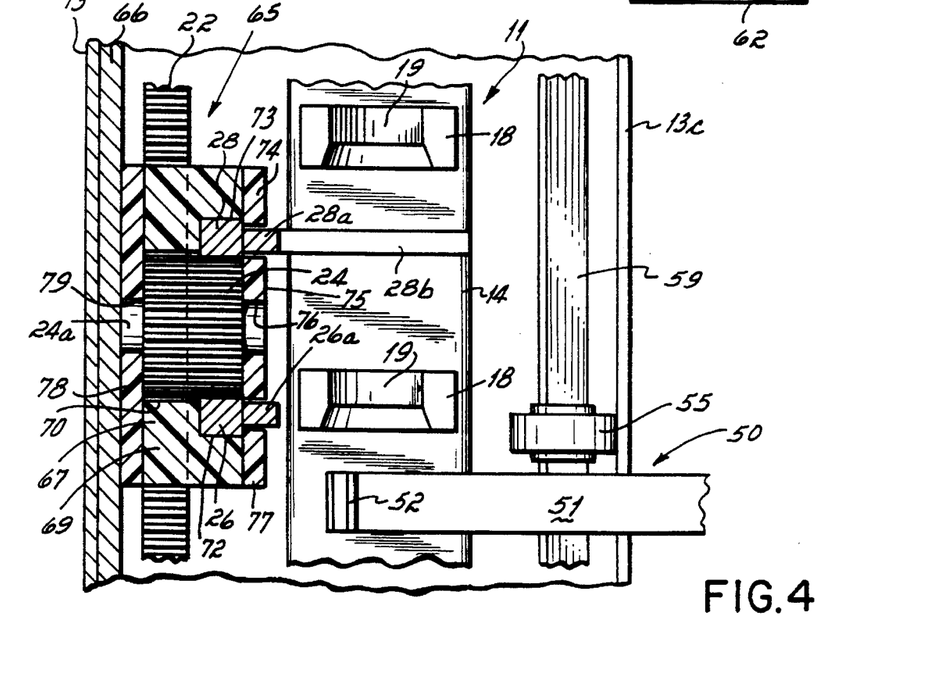
FIG. 4 is a cross-sectional view taken along 4—4 of FIG. 3.

The bar stock supporting and centering mechanism 11 will now be described in detail with particular reference to FIGS. 3 & 4. As shown in FIGS. 3 and 4, gearboxes 65 are provided to translate the back and forth motion of the elongated horizontal rack 22 into opposite vertical movement of the upper and lower support rails 12, 14. Each gearbox 65 is rigidly affixed to the housing 13 by way of a mounting plate 66 and includes a gearbox housing 67 preferably formed in a layered construction from self-lubricating polymeric material such as "Nylatron", a nylon material having solid lubricant dispersed throughout. The housing 67 includes grooves or slots and holes therein for properly receiving and allowing motion of the various gear components such as the elongated rack 22, the pinion 24, and the vertical racks 26, 28 received within the housing 67.

More specifically, the gearbox housing 67 comprises a central block 69 having a center hole 70 for receiving and allowing rotation of the pinion 24. The central block 69 further includes a groove 71, as best shown in FIG. 3, which communicates with the center hole 70 and receives the elongated horizontal rack 22 for sliding movement therein such that the gear teeth on rack 22 engage the gear teeth on the pinion 24. As best shown in FIG. 4, the central block 69 also includes a pair of grooves or slots 72, 73 for respectively receiving the vertical racks 26, 28 and allowing sliding movement of the vertical racks 26, 28 therein. Each of the grooves or slots 72, 73 also communicate with the central hole 70 on diametrically opposed sides thereof to allow the gear teeth of each of the vertical racks 26, 28 to engage diametrically opposite portions of the pinion 24 such that rotation of the pinion 24 in either direction causes translation of the vertical racks 26, 28 in opposite directions.

As best shown in FIG. 4, to maintain each of the racks 22, 26, 28 in their respective grooves 71, 72, 73 within the central block 69, a plurality of outer plates 74, 75, 77, 78 are rigidly secured on opposite sides of the central block 69. Each of these outer plates 74, 75, 77, 78 are formed from the same self-lubricating polymeric material, e.g., "Nylatron", as the central block 69. Three of these outer plates 74, 75, 77 are rigidly secured as by bolts (not shown) to one side of the central block 69 to maintain the vertical racks 26, 28 within their respective grooves 72, 73 and also to help maintain the pinion 24 within the center hole 70 and in engagement with each of the racks 22, 26 and 28. On the opposite side of the central block 69, a fourth outer plate 78 maintains the horizontal rack 22 within the groove 71 in the central block 69 and also helps maintain the pinion 24 within the center hole 70 and in engagement with each of the racks 22, 26 and 28. The two outer plates 75, 78 which maintain the pinion 24 in the center hole 70 further include respective central apertures 76, 79 which rotatably receive the shaft 24a of the pinion 24 so as to allow rotation of the pinion 24 within the center hole 70.

As best seen in FIG. 4, the spaces formed between outer plates 75 and 77 and between outer plate 74 and 75 respectively receive stepped down portions 26a, 28a of the vertical racks 26, 28. As shown in FIG. 4, stepped down portion 26a allows plate 77 to overlap or extend over vertical rack 26 to maintain vertical rack 26 within the slot or groove 72 and stepped down portion 28a allows outer plate 74 to overlap or extend over vertical rack 28 to maintain vertical rack 28 within the slot or groove 73. As best shown in FIG. 3, the stepped down portions 26a, 28a have extensions 26b, 28b which are respectively rigidly secured to the upper and lower support rails 12, 14. Thus, it will be appreciated that when the elongated horizontal rack 22 is moved to the right as viewed from the front of the apparatus 10 (or moved into the page as viewed in FIG. 3), the pinion 24 will rotate so as to move vertical rack 26 downwardly and vertical rack 28 upwardly so as to likewise move stepped down portion 26a, extension 26b and upper support rail 12 downwardly and stepped down portion 28a, extension 28b and lower support rail 14 upwardly until the bar stock 20 is rotatably supported and centered between the support blocks 16, 18 along axis 21 which is substantially if not exactly the turning axis 91 of the machine tool or lathe 115 shown in FIG. 2.

Adjustable Stop of the Supporting and Centering Mechanism

Figure 5:
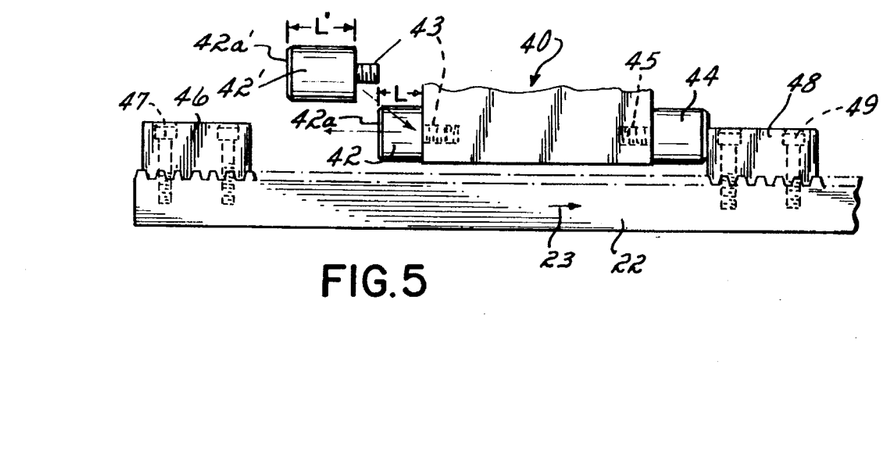
FIG. 5 is an enlarged view of the adjustable stop mechanism of the present invention taken as indicated by encircled area 5—5 of FIG. 2.

FIG. 5 shows the adjustable stop mechanism 40 of the present invention which may be set so as to stop the inward movement of the upper and lower support rails 12, 14 (as best shown in FIG. 3) when there is preferably about a 1–2 millimeter gap between the inside surfaces of recesses 17 and outer surface of the bar stock 20 at the closest points of engagement therebetween. In this position the bar stock 20 is substantially centered along the axis 91 of the machine tool or lathe 115 and is supported for rotation during a machining operation. As previously mentioned with respect to FIG. 2, the stop mechanism 40 is stationary with respect to the elongated horizontal rack 22 and is preferably mounted to the housing 13. As illustrated in FIG. 5, the stop mechanism 40 includes gauge blocks 42, 44 on opposite sides thereof for stopping motion of the elongated horizontal rack 22 in each direction. A pair of stops 46, 48 are rigidly secured to the elongated horizontal rack 22 by, for example, bolts 47, 49. Thus, for example, when the gauge block 42 engages the stop 46 during movement of the elongated horizontal rack 22 to the right as shown in FIG. 5, movement of the elongated horizontal rack 22 will stop and thus stop the inward movement of each of the support rails 12, 14 at the proper time for a particular diameter of bar stock 20. Each of the gauge blocks 42, 44 is preferably removably attached to the stop mechanism 40 by way of respective threaded studs 43, 45 which are received in respective threaded holes located in opposite sides of the stop mechanism 40.

Particularly due to gauge block 42, the stop mechanism 40 is quickly adjustable to change over the apparatus 10 to accommodate bar stock 20 of a different diameter. More specifically, gauge block 42 has a length L which has a corresponding relationship to the particular diameter of bar stock 20 to be held in the apparatus 10. This corresponding relationship will depend, for example, on the specific dimensions of the stop mechanism 40 as well as the range of movement necessary in a given application. For example, if one inch diameter bar stock 20 is being run through the feed apparatus 10, a corresponding gauge block 42 will be chosen having a length L which will cause the stop 46 to engage the end 42a of the gauge block 42 when the upper and lower support blocks 16, 18 have moved toward one another until the bar stock is rotatably engaged, i.e., in the preferred embodiment until there is about a 1–2 millimeter gap between the inner sides of the upper recesses 17 and the outer surface of the bar stock 20 at the closest points therebetween as mentioned above. Thus, as illustrated in FIG. 5, a gauge block 42 having a length L which, for example, corresponds to a bar stock diameter of one inch, may be quickly replaced by a gauge block 42' having a length L' which, for example, corresponds to a bar stock diameter of 1½ inches.

Since the gauge block 44 on the opposite side of the stop mechanism 40 is simply used to stop the outward movement of the upper and lower support rails 12, 14, this gauge block 44 need not be replaceable by gauge blocks of different sizes but need only be chosen to have a length which stops the outward movement of the upper and lower support rails 12, 14 in accordance with the inner dimensions of the housing 13 and to accommodate the greatest desired diameter of bar stock 20 to be run through the apparatus 10.

Loading/Unloading Mechanism

Turning to FIGS. 3 & 4, a loading and unloading mechanism 50 is shown and comprises a plurality of at least two pivotally mounted levers 51 (only one of which is shown in FIGS. 3 & 4) each including a central mounting 56. The central mounting 56 is rigidly secured to an elongated rod 59 extending between each lever 51 and being pivotable within a plurality of bearing members 55 (only one of which is shown in FIGS. 3 & 4) which are rigidly affixed to the housing 13 such as by welding. The specific number of levers 51 will depend on the length as well as the weight of the largest bar stock 20 to be run in the feed apparatus 10. Each lever 51 includes upturned portions or lips 52, 53 at its outer ends. The levers 51 are mounted to the housing 13 such that lip 52 is disposed between the upper and lower support rails 12, 14 of the supporting and centering mechanism 11. The opposite lip 53 is disposed outside the housing 13 a safe distance away from the moving parts located therein.

As shown in FIG. 3, the end of at least one lever 51 which is disposed outside of housing 13 is pivotally attached to the rod 60 of an actuator which is preferably a double-acting pneumatic cylinder 61. Preferably, more than one pneumatic cylinder 61 is utilized in the loading and unloading mechanism 50 to ensure smooth loading and unloading operations. For example, a cylinder 61 may be coupled, as shown, to each lever 51 and caused to operate simultaneously to smoothly load and unload bar stock 20. The pneumatic cylinder 61 is also attached at a pivot point 62 to a bracket 63 which is rigidly mounted, as by welding, to the housing 13. This pivot 62 allows the cylinder 61 to pivot (during loading and unloading operations) perpendicularly to the housing 13 or, in other words, about an axis through pivot 62 which is parallel to axes 21, 91.

When it is desired to load a length of bar stock 20 into the apparatus 10, the length of bar stock 20 is placed onto the levers 51 such that it rests against the lip 53 of each lever 51 as shown in solid lines in FIG. 3. When the cylinder rod 60 is extended so as to pivot the lever 51 to the position shown in phantom in FIG. 3, the bar stock 20 will roll down the upper surface of each lever 51 until it stops against lips 52 of the levers 51. Once the length of bar stock 20 has been loaded in this manner, the bar stock supporting and centering mechanism 11 raises the bar stock 20 such that its axis 21 is substantially if not exactly coincident with the axis 91 of the lathe or machine tool 115 shown in FIG. 2. If, for example, the machining operation is one in which only one end or both ends of the length of bar stock 20 is to be machined, then the bar stock 20 may be withdrawn from the lathe or machine tool 115 and then may be unloaded from the apparatus 10 by retracting the cylinder rods 60 connected to the levers 51 to thus pivot the levers 51 back to the position shown in solid lines in FIG. 3. The length of bar stock 20 then rolls back down the levers 51 and out of the housing 13 to rest against the lips 53 a safe distance away from moving parts within the housing 13. The bar stock 20 may then be safely handled and turned around for machining the other end thereof or replaced by another piece of bar stock 20. Of course, the placement and removal of bar stock 20 into and from the bar stock loading and unloading mechanism 50 may also be performed in an automatic manner as well.

It will be appreciated that the length of bar stock 20 need not be loaded exactly at the horizontal and vertical midpoint of the upper and lower bar stock supports 16, 18 (as viewed in FIG. 3) to be adequately engaged and centered by the supporting and centering mechanism 11. In this regard, as long as the length of bar stock 20 is loaded such that the "V"-shaped recesses 19 of the lower bar stock support blocks 18 can engage the bar stock 20 as the lower support rail 14 is raised, the length of bar stock 20 will center itself within the "V"-shaped recesses 19 and the upper and lower support rails 12, 14 will then center the bar stock 20 at least substantially along axis 91 as previously described.

Fail-Safe Mechanism

Figure 6:
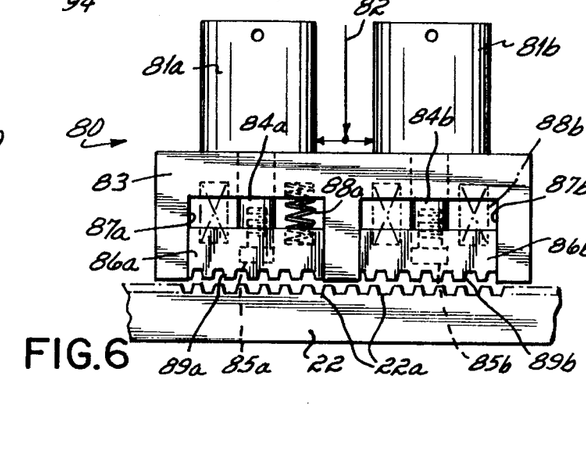
FIG. 6 is an enlarged view of the fail-safe mechanism of the present invention taken as indicated by encircled area 6—6 of FIG. 2; and, FIG. 7 is an enlarged view of the bar stock feed mechanism of the present invention taken as indicated by encircled area 7—7 of FIG. 2.

FIG. 6 illustrates the fail-safe mechanism 80 of the present invention which causes all motion of the centering mechanism 11 to cease upon a loss of fluid pressure to the cylinders 30 which control movement of the supporting and centering mechanism 11. The fail-safe mechanism 80 includes a pair of cylinders 81a, 81b which operate off the same source 82 of fluid pressure, such as air pressure, as the cylinders 30 which control movement of the supporting and centering mechanism 11. Each of these cylinders 81a, 81b are rigidly mounted to a frame 83 which in turn is affixed to the inside of the housing 13. The cylinders 81a, 81b include respective piston rods 84a, 84b which are attached by way of bolts 85a, 85b to respective toothed members 86a, 86b. The toothed members 86a, 86b are slidably received within respective spaces 87a, 87b in the frame 83. Furthermore, the toothed members 86a, 86b are received within the spaces 87a, 87b in a spring loaded fashion by way of compression springs 88a, 88b which are disposed between the respective toothed members 86a, 86b and the frame 83.

When each of the cylinders 81a, 81b receives fluid pressure from the supply 82, the cylinder rods 84a, 84b retract the toothed members 86a, 86b against the force of the compressions springs 88a, 88b. When there is a loss of fluid pressure, however, the cylinder rods 84a, 84b are no longer forced into a retracted position and therefore the toothed members 86a, 86b are forced to slide in the opposite direction against the elongated horizontal rack 22 under the force of the compression springs 88a, 88b. In this way, the teeth 89a of toothed member 86a or the teeth of 89b the toothed member 86b will lock in engagement with the teeth 22a of the elongated horizontal rack 22 to stop any translation of rack 22 and thereby prevent the centering mechanism 11 from catastrophically releasing its engagement with the bar stock 20. So as to reduce the length of travel of the horizontal rack 22 before one of the toothed members 86a or 86b can engage the teeth 22a of the rack 22 after a loss of fluid pressure, the teeth 89a of toothed member 86a are longitudinally offset from the teeth 89b of toothed member 86b with respect to the teeth 22a of the elongated horizontal rack 22. This offset is approximately one-half the width of a tooth 22a, 89a or 89b.

Bar Stock Feeding Mechanism

Figure 7:
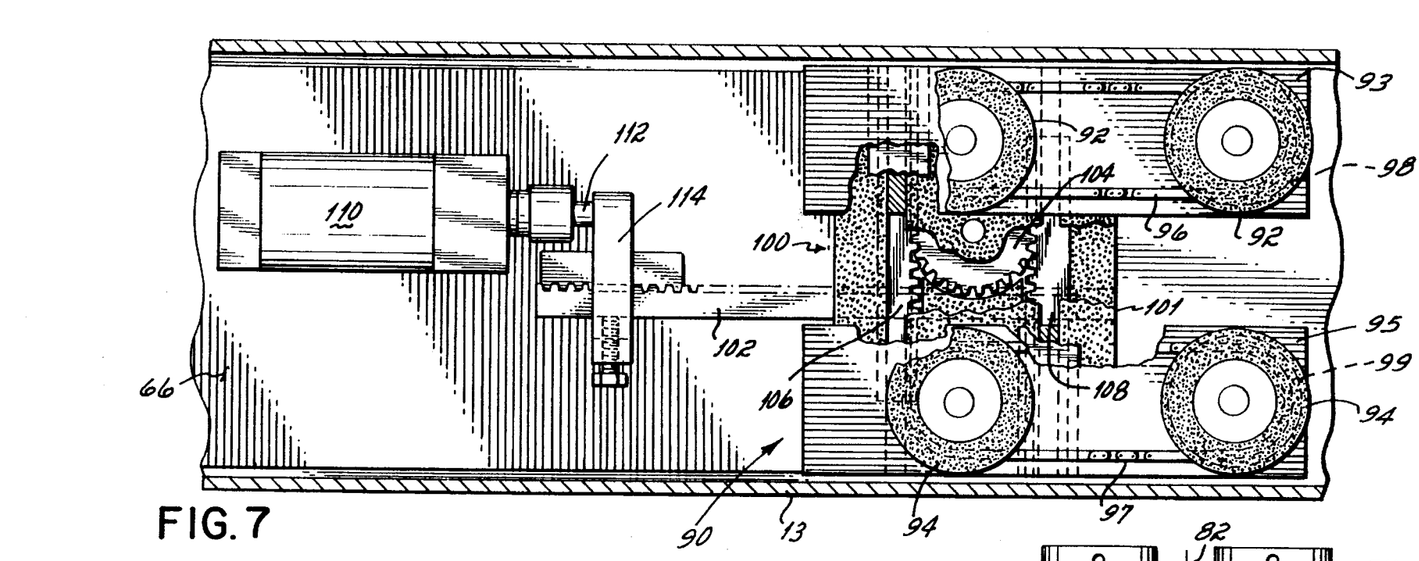

The bar stock feeding mechanism 90 of the present invention is best illustrated in FIG. 7. The bar stock feeding mechanism 90 utilizes a pair of upper feed rollers 92 and a pair of lower feed rollers 94 to move a length of bar stock 20 along axis 91 and into the machine tool or lathe 115. The upper and lower feed rollers 92, 94 are both preferably formed from a resilient rubber-like material such as neoprene rubber. The upper feed rollers 92 and lower feed rollers 94 are rotatably mounted to respective roller supports 93, 95 which move both toward and away from one another to engage and disengage a length of bar stock 20 therebetween. The upper feed rollers 92 are connected for simultaneous rotation by a chain 96 and the lower feed rollers 94 are likewise connected by a chain 97. One of the upper rollers 92 is rotated by, for example, a reversible hydraulic motor 98 and one of the lower feed rollers 94 is rotated by a second reversible hydraulic motor 99 in a direction opposite to the direction of rotation of the upper feed rollers 92. Thus, operation of the respective reversible hydraulic motors 98, 99 in one direction will feed bar stock 20 into the lathe 115 while operation of the respective hydraulic motors 98, 99 in the other direction will withdraw the bar stock 20 from the lathe 115.

The means for causing the upper and lower roller supports 93, 95 and their attached upper and lower feed rollers 92, 94 to move either toward and away from one another includes a gearbox 100 mounted to housing 13 by way of mounting plate 66. The gearbox 100 is substantially the same in concept and design as the gearboxes 65 which cause such motion of the upper and lower support rails 12, 14 of the bar stock supporting and centering mechanism 11. In this regard, the gearbox 100 translates back and forth movement of a horizontal rack 102 into opposite vertical movements of the respective roller supports 93, 95. It will be appreciated that the horizontal rack 102 therefore performs the same function as the elongated horizontal rack 22 of the supporting and centering mechanism 11. The gearbox 100 includes a housing 101 preferably formed of "Nylatron" as are the gearboxes 65. The housing 101 encloses a pinion 104 and a pair of vertical racks 106, 108 which are respectively rigidly secured to the upper and lower roller supports 93, 95. Thus, vertical rack 106 causes up and down movement of the upper feed roller support 93 while vertical rack 108 causes up and down movement of the lower feed roller support 95 in response to rotation of pinion 104. The horizontal rack 102 slides within the gearbox housing 101 and engages the pinion 104 such that back and forth motion of the horizontal rack 102 causes rotation of the pinion 104 in opposite directions to thus cause the vertical racks 106, 108 and the upper and lower roller supports 93, 95 to move vertically and either engage or disengage the bar stock 20.

As with the elongated horizontal rack 22, the horizontal rack 102 is actuated by a fluid operated cylinder such as a double-acting pneumatic cylinder 110 being mounted to plate 66 and having a cylinder rod 112 which is connected to the horizontal rack 102 by a bracket 114. When the cylinder rod 112 is fully retracted as shown in FIG. 7, the feed rollers 92, 94 are moved to a disengaged position, for example, adjacent to respective upper and lower inner wall portions of the housing 13. When a length of bar stock 20 has been loaded into the apparatus 10 and, more specifically, into the supporting and centering mechanism 11 and the feeding mechanism 90, the cylinder 110 is actuated to extend the cylinder rod 112 thereby moving the horizontal rack 102 into the gear housing 101. Movement of the horizontal rack 102 into the gear housing causes the pinion 104 to rotate in a counterclockwise direction, as viewed in FIG. 7, thus moving vertical rack 106 and upper feed roller support 93 downwardly and vertical rack 108 and lower feed roller support 95 upwardly such that upper and lower feed rollers 92, 94 firmly engage opposite upper and lower outer surfaces of the bar stock 20. The hydraulic motors 98, 99 are then activated to feed the bar stock 20 into the machine tool or lathe 115. The feed rollers 92, 94 are disengaged from the bar stock 20 when it is necessary to rotate the bar stock 20 in the machine tool or lathe 115. When the machining operation is finished and it is desired to withdraw the bar stock 20 from the machine tool or lathe 115, such as the at the end of a machining operation performed on one end of the bar stock 20, the hydraulic motors 98, 99 are reversed to cause the feed rollers 92, 94 to withdraw the bar stock 20 from the machine tool or lathe 115. The bar stock 20 is then unloaded from the apparatus 10 and turned around, if desired, to feed the opposite end into machine tool or lathe 115 for machining thereof.

Operation

Referring first to FIGS. 1, 2 and 5, when initially setting up the apparatus 10 to rotatably support, center and feed a particular diameter of bar stock 20, the stop mechanism 40 is adjusted to correspond to that diameter of bar stock 20. More specifically, a gauge block 42 is chosen having a length L which corresponds to the particular diameter of bar stock 20 being run in the apparatus 10. Once the correct gauge block 42 has been threaded into the stop mechanism 40, the apparatus 10 is ready for operation.

Referring now to FIGS. 1 and 3, a length of bar stock 20 is placed onto the bar stock loading and unloading mechanism 50 and, more particularly, onto the plurality of levers 51 such that it rests against the outer lips 53 of each lever 51 a safe distance away from the housing 13. The cylinder or cylinders 61 are then actuated to pivot the levers 51 in the direction of arrow 57 to the position shown in FIG. 1 such that the length of bar stock 20 rolls down the levers 51 and preferably situates 20 itself within the "V"-shaped recesses 19 of the lower support blocks 18 and between the feed rollers 92, 94. The levers 51 remain in the position shown in FIG. 1 during the machining operation.

Referring to FIG. 1, the cylinder or cylinders 30 are actuated to move the elongated horizontal rack 22 to the left as viewed from the rear in FIG. 1 (or to the right as viewed from the front) to thereby cause clockwise rotation of the pinions 24 in the direction of arrows 25 as well as vertical movement of the racks 26, 28 in the respectively opposed directions represented by arrows 27, 29. Thus, the upper support rail 12 moves downwardly and the lower support rail 14 moves upwardly until the replaceable gauge block 42 hits the stop 46. At this time the inner side surfaces of the "V"-shaped recesses 17 of the upper support blocks 16 are preferably approximately 1–2 millimeters away from the outer surface of the bar stock 20 at the closest points therebetween. In this position, the upper and lower support blocks 16, 18 rotatably support the length of bar stock 20.

Referring now to FIGS. 2 and 7, the bar stock feeding mechanism 90 then operates to feed the bar stock 20 into the lathe or machine tool 115. More specifically, as viewed in FIG. 7, the cylinder 110 is actuated to extend cylinder rod 112 and move the horizontal rack 102 to the right thereby causing the upper and lower roller supports 93, 95 to move toward one another such that the upper and lower feed rollers 92, 94 firmly engage diametrically opposed upper and lower surfaces of the bar stock 20. After engagement of the bar stock 20, the hydraulic motors 98, 99 are rotated in opposite directions, i.e., hydraulic motor 98 rotates the upper feed rollers 92 in a counterclockwise direction and hydraulic motor 99 rotates the lower feed rollers 94 in a clockwise direction, to thereby feed the bar stock 20 into the lathe or machine tool 115. Once the bar stock 20 is properly received in the machine tool or lathe 115, the feed rollers 92, 94 are disengaged from the bar stock 20 by retraction of cylinder rod 112. This allows the machine tool or lathe 115 to rotate the bar stock 20 if and/or when necessitated by the desired machining operation. After the machining operation is completed and it is desired to withdraw the bar stock 20 from the machine tool or lathe 115 so as to, for example, unload the bar stock 20 from the apparatus 10 and turn it around to machine the opposite end thereof, the upper and lower feed rollers 92, 94 are again firmly engaged with the bar stock 20 and the hydraulic motors 98, 99 are reversed to withdraw the bar stock 20 from the machine tool or lathe 115.

Referring to FIGS. 1 and 3, when the bar stock 20 is fully withdrawn back into the apparatus 10, the loading and unloading mechanism 50 is used to safely unload the bar stock 20 from the housing 13. In this regard, the levers 51 are pivoted in the direction of arrow 58 by retracting the cylinder rod(s) 60 of cylinder(s) 61 and causing the bar stock 20 to roll out of the housing 13 and rest against the outer lips 53 of levers 51 for easy access by the operator. The length of bar stock 20 may then be safely removed either manually or automatically from the loading and unloading mechanism 50 and, if necessary, turned around so as to machine the opposite end thereof.

It will be appreciated that if there is a loss of fluid pressure to the apparatus 10 such as through the severing of an air line leading to one or more of the cylinders 30 during a machining operation, this loss of fluid pressure will cause the fail-safe mechanism 80 to stop the movement of the horizontal rack 22 as previously explained and thereby prevent the upper and lower bar stock support blocks 16, 18 from disengaging the bar stock 20.

While the present invention has been illustrated by the description of a preferred embodiment, and while this preferred embodiment has been described in considerable detail, it is not intended to restrict or in any way limit the scope of the appended claims to such detail. Additional substitutions, advantages and modifications will readily appear to those of skill in the art. For example, it is contemplated that the bar stock supporting and centering mechanism 11 is usable by itself and need not be used in conjunction with the specific bar stock feeding mechanism 90 as shown and described. In this regard, another automatic feeding mechanism may be provided or, alternatively, the bar stock 20 may be manually fed into the lathe or machine tool 115. Likewise, the bar stock feeding mechanism 90 of the present invention may be advantageously utilized in certain applications without the specific bar stock supporting and centering mechanism 11 of the present invention.

Furthermore, in regard to the adjustable stop mechanism 40 of the present invention, the replaceable gauge block 42 may be substituted with a gauge block which, for example, is adjustable in length by way of a micrometer-type adjustment mechanism. This would eliminate the need to stock several gauge blocks of various lengths to accommodate corresponding diameters of bar stock 20. Instead, a plurality of settings on the micrometer-type adjustment mechanism would correspond to a plurality of different diameters of bar stock. Additionally, proximity switches may be used in conjunction with the stop mechanism 40 as a safety measure to ensure that the gauge block 42 has engaged the stop 46 and thus that the length of bar stock 20 is properly supported and centered before the machining operation begins.

It will also be appreciated that although the self-lubricating materials used in the preferred embodiment for constructing support blocks 16, 18 and gearboxes 65, 100 generally will not require additional lubricants, the unique design of the housing 13 as a square tube with a lengthwise cut out 13c covered by a flap 31 also easily allows the use of liquid lubricants and/or coolants sprayed onto the bar stock 20 as well as onto the bar stock support members 16, 18 during the machining operation. Moreover, the support blocks 16, 18 may be substituted with other types of bearing members formed from other materials. Other linear bearing units may also be used in the construction of gearboxes 65, 115.

Finally, while spacial reference terms such as "upper", "lower", "horizontal" and "vertical" have been used throughout the description of the preferred embodiment, it will be appreciated that the apparatus 10 as well as the various components thereof may be oriented differently than described while still retaining the inventive concepts disclosed herein.

The invention in its broadest aspects is therefore not limited to the specific details, representative apparatus and method, and illustrative examples having been described. Accordingly, departures may be made from such details without departing from the spirit or scope of the general inventive concept,

What is claimed is:

1. Apparatus for feeding bar stock comprising:

first and second support rails mounted for movement toward and away from one another, a plurality of bar stock support members attached at spaced locations along opposed surfaces of said support rails, said bar stock support members respectively including opposed recesses for receiving said bar stock, said opposed recesses being equidistantly spaced from a longitudinal axis, at least one gear system operatively connected between said support rails, said gear system allowing movement of said support rails toward and away from one another while maintaining said opposed recesses equidistantly spaced from said longitudinal axis, at least one actuator operatively coupled to said gear system for causing said gear system to move said first and second support rails both toward and away from each other, wherein said actuator moves said rails toward each other until said bar stock located therebetween is supported and centered along said longitudinal axis, and a bar stock feeding mechanism mounted proximate one end of said support rails for moving bar stock along said longitudinal axis.

2. The apparatus of claim 1 wherein said recesses allow rotatable support of said bar stock therein and said actuator moves said rails toward each other until said bar stock is rotatably supported and centered along said longitudinal axis.

3. The apparatus of claim 2 further comprising an adjustable stop mechanism operatively connected to said actuator for stopping said first and second support rails and members when a predetermined size of bar stock is rotatably supported and centered therebetween.

4. The apparatus of claim 3 further comprising an elongated rack engaging said rack and pinion gear system, wherein said actuator is connected to said elongated rack for moving said elongated rack in a first direction which moves said first and second support rails toward one another and a second direction which moves said first and second support rails away from one another, said elongated-rack including a first stop member rigidly affixed thereto for stopping movement of said elongated rack in said first direction, said stop mechanism further including a first gauge block removably attached to said stop mechanism and adapted to engage said first stop member to stop movement of said elongated rack in said first direction, said first gauge block being replaceable with other gauge blocks of varying size to vary the amount of travel between said support members by predetermined amounts.

5. The apparatus of claim 4 wherein said stop mechanism further includes a second gauge block removably attached thereto and said elongated rack includes a second stop member rigidly affixed thereto for stopping the movement of said rack in said second direction after a predetermined amount of movement.

6. The apparatus of claim 1 wherein said gear system is a rack and pinion gear system.

7. The apparatus of claim 6 further comprising an elongated rack engaging said rack and pinion gear system, said actuator being connected to said elongated rack for causing back and forth movement thereof and, through said rack and pinion gear system, causing movement of said support rails toward and away from each other.

8. The apparatus of claim 7 further comprising a plurality of rack and pinion gear systems operatively connected between said first and second support rails and at spaced locations along said support rails.

9. The apparatus of claim 8 further comprising a plurality of actuators connected to said elongated rack for causing back and forth movement thereof and, through said rack and pinion gear system, causing movement of said support rails toward and away from each other.

10. The apparatus of claim 7 wherein said rack and pinion gear system includes a pinion rotatably mounted between first and second opposed racks, said first opposed rack being rigidly connected to said first support rail and said second opposed rack being rigidly connected to said second support rail and said pinion further being in engagement with said elongated rack.

11. The apparatus of claim 10 wherein said actuator further comprises at least one double acting cylinder and a source of fluid pressure for operating said double acting cylinder.

12. The apparatus of claim 11 further comprising a fail-safe mechanism including means for stopping the movement of said first rack upon a drop in pressure to said double acting cylinder.

13. The apparatus of claim 12 wherein said fail-safe mechanism further comprises:
    at least one fluid powered cylinder operatively connected to said source of fluid pressure and having a movable member which is movable under the force of said fluid pressure, said movable member further being connected to a toothed member which is held in spaced relation with respect to said elongated rack when said movable member is retracted under the force of said fluid pressure, wherein teeth on said toothed member are adapted to mate with teeth on said elongated rack when said movable member is extended with respect to said cylinder, and
    at least one compression spring mounted between said toothed member and said fluid powered cylinder, said spring acting to force said toothed member against said elongated rack upon a predetermined drop in said fluid pressure.

14. The apparatus of claim 13 wherein said fail safe mechanism further comprises:
    a second fluid powered cylinder and a second toothed member attached to a movable member of said second fluid powered cylinder, said second toothed member being held in spaced relation with respect to said elongated rack when said movable member is retracted under the force of said fluid pressure, wherein teeth on said toothed member are adapted to mate with teeth on said elongated rack when said movable member is extended with respect to said cylinder, and
    at least one compression spring mounted between said second toothed member and said second fluid powered cylinder, said spring acting to force said second toothed member against said first rack upon a predetermined drop in said fluid pressure.

15. The apparatus of claim 14 wherein the teeth on said first toothed member are offset with respect to the teeth on said second toothed member so as to decrease the amount of movement of said elongated rack upon said predetermined drop in said fluid pressure.

16. The apparatus of claim 6 further comprising a plurality of rack and pinion gear systems operatively connected between said first and second support rails and at spaced locations along said support rails.

17. The apparatus of claim 16 further comprising a plurality of actuators connected to said elongated rack for causing back and forth movement thereof and, through said rack and pinion gear system, causing movement of said support rails toward and away from each other.

18. The apparatus of claim 1 further comprising an adjustable stop mechanism operatively connected to said actuator for stopping said first and second support rails and members when a predetermined size of bar stock is supported and centered therebetween.

19. The apparatus of claim 18 further comprising an elongated rack engaging said rack and pinion gear system, wherein said actuator is connected to said elongated rack for moving said elongated rack in a first direction which moves said first and second support rails toward one another and a second direction which moves said first and second support rails away from one another, said elongated rack including a first stop member rigidly affixed thereto for stopping movement of said elongated rack in said first direction, said stop mechanism further including a first gauge block removably attached to said stop mechanism and adapted to engage said first stop member to stop movement of said elongated rack in said first direction, said first gauge block being replaceable with other gauge blocks of varying size to vary the amount of travel between said support members by predetermined amounts.

20. The apparatus of claim 19 wherein said stop mechanism further includes a second gauge block removably attached thereto and said elongated rack includes a second stop member rigidly affixed thereto for stopping the movement of said rack in said second direction after a predetermined amount of movement.

21. The apparatus of claim 1 wherein said bar stock support members of said first support rail are disposed in staggered relation to said bar stock support members of said second support rail.

22. The apparatus of claim 1 further comprising a bar stock loading and unloading mechanism including at least two pivotally mounted levers extending transverse to said first and second support rails and operable to both load bar stock between said first and second support rails and unload bar stock from between said first and second support rails.

23. The apparatus of claim 22 wherein said levers are connected by a rod and said loading an unloading mechanism further comprises an actuator connected to one end of at least one of said levers for pivoting said levers in loading and unloading directions.

24. The apparatus of claim 1 wherein said bar stock feeding mechanism further comprises:
    at least two feed rollers, wherein one roller is mounted proximate an end of said first support rail and one roller is mounted proximate said and end of said second support rail,
    an actuator operatively connected to said feed rollers for moving said feed rollers toward and away from one another so as to respectively engage and disengage bar stock centered between said first and second support rails, and
    a drive for rotating at least one of said feed rollers for moving said bar stock along said longitudinal axis when said feed rollers are in engagement with said bar stock.

25. The apparatus of claim 24 wherein said feeding mechanism further comprises:
    an actuating rack connected to a movable member of said actuator for back and forth movement therewith,
    a second gear system connected between said actuating rack and said feed rollers for translating back and forth movement of said actuating rack into inward and outward movement of said feed rollers with respect to each other, wherein movement of said actuating rack in a first direction moves said feed rollers toward one another and movement of said rack in a second direction moves said feed rollers away from one another.

26. The apparatus of claim 25 wherein said bar stock feeding mechanism includes at least four feed rollers, a pair of said feed rollers being operatively connected to said second gear system proximate said first support rail and a pair of said feed rollers being operatively connected to said second gear system proximate said second support rail, wherein a drive is operatively coupled to at least one roller in each pair of rollers for rotating said rollers in opposite directions.

27. The apparatus of claim 26 wherein a drive is operatively coupled to each roller of said pairs of rollers.

28. Bar stock supporting and centering apparatus comprising:

first and second support rails mounted for movement toward and away from one another, a plurality of bar stock support members attached at spaced locations along opposed surfaces of said support rails, said bar stock support members respectively including opposed recesses for rotatably receiving said bar stock, said opposed recesses being equidistantly spaced from a longitudinal axis, at least one gear system operatively connected between said support rails, said gear system allowing movement of said support rails toward and away from one another while maintaining said opposed recesses equidistantly spaced from said longitudinal axis, at least one actuator operatively coupled to said gear system for causing said gear system to move said first and second support rails both toward and away from each other, wherein said actuator moves said rails toward each other until said bar stock located therebetween is supported and centered along said longitudinal axis.

29. The apparatus of claim 1 wherein said recesses allow rotatable support of said bar stock therein and said actuator moves said rails toward each other until said bar stock is rotatably supported and centered along said longitudinal axis.

30. The apparatus of claim 29 further comprising an adjustable stop mechanism operatively connected to said actuator for stopping said first and second support rails and members when a predetermined size of bar stock is rotatably supported and centered therebetween.

31. The apparatus of claim 30 further comprising an elongated rack engaging said rack and pinion gear system, wherein said actuator is connected to said elongated rack for moving said elongated rack in a first direction which moves said first and second support rails toward one another and a second direction which moves said first and second support rails away from one another, said elongated rack including a first stop member rigidly affixed thereto for stopping movement of said elongated rack in said first direction, said stop mechanism further including a first gauge block removably attached to said stop mechanism and adapted to engage said first stop member to stop movement of said elongated rack in said first direction, said first gauge block being replaceable with other gauge blocks of varying size to vary the amount of travel between said support members by predetermined amounts.

32. The apparatus of claim 31 wherein said stop mechanism further includes a second gauge block removably attached thereto and said elongated rack includes a second stop member rigidly affixed thereto for stopping the movement of said rack in said second direction after a predetermined amount of movement.

33. The apparatus of claim 28 wherein said gear system is a rack and pinion gear system.

34. The apparatus of claim 33 further comprising an elongated rack engaging said rack and pinion gear system, said actuator being connected to said elongated rack for causing back and forth movement thereof and, through said rack and pinion gear system, causing movement of said support rails toward and away from each other.

35. The apparatus of claim 34 further comprising a plurality of rack and pinion gear systems operatively connected between said first and second support rails and at spaced locations along said support rails.

36. The apparatus of claim 35 further comprising a plurality of actuators connected to said elongated rack for causing back and forth movement thereof and, through said rack and pinion gear system, causing movement of said support rails toward and away from each other.

37. The apparatus of claim 34 wherein said rack and pinion gear system includes a pinion rotatably mounted between first and second opposed racks, said first opposed rack being rigidly connected to said first support rail and said second opposed rack being rigidly connected to said second support rail and said pinion further being in engagement with said elongated rack.

38. The apparatus of claim 37 wherein said actuator further comprises at least one double acting cylinder and a source of fluid pressure for operating said double acting cylinder.

39. The apparatus of claim 38 further comprising a fail-safe mechanism including means for stopping the movement of said first rack upon a drop in pressure to said double acting cylinder.

40. The apparatus of claim 39 wherein said fail-safe mechanism further comprises:

at least one fluid powered cylinder operatively connected to said source of fluid pressure and having a movable member which is movable under the force of said fluid pressure, said movable member further being connected to a toothed member which is held in spaced relation with respect to said elongated rack when said movable member is retracted under the force of said fluid pressure, wherein teeth on said toothed member are adapted to mate with teeth on said elongated rack when said movable member is extended with respect to said cylinder, and at least one compression spring mounted between said toothed member and said fluid powered cylinder, said spring acting to force said toothed member against said elongated rack upon a predetermined drop in said fluid pressure.

41. The apparatus of claim 40 wherein said fail-safe mechanism further comprises:

a second fluid powered cylinder and a second toothed member attached to a movable member of said second fluid powered cylinder, said second toothed member being held in spaced relation with respect to said elongated rack when said movable member is retracted under the force of said fluid pressure, wherein teeth on said toothed member are adapted to mate with teeth on said elongated rack when said movable member is extended with respect to said cylinder, and at least one compression spring mounted between said second toothed member and said second fluid powered cylinder, said spring acting to force said second toothed member against said first rack upon a predetermined drop in said fluid pressure.

42. The apparatus of claim 41 wherein the teeth on said first toothed member are offset with respect to the teeth on said second toothed member so as to decrease the amount of movement of said elongated rack upon said predetermined drop in said fluid pressure.

43. The apparatus of claim 35 further comprising a plurality of rack and pinion gear systems operatively connected between said first and second support rails and at spaced locations along said support rails.

44. The apparatus of claim 43 further comprising a plurality of actuators connected to said elongated rack for causing back and forth movement thereof and, through said rack and pinion gear system, causing movement of said support rails toward and away from each other.

45. The apparatus of claim 28 further comprising an adjustable stop mechanism operatively connected to said actuator for stopping said first and second support rails and members when a predetermined size of bar stock is supported and centered therebetween.

46. The apparatus of claim 45 further comprising an elongated rack engaging said rack and pinion gear system, wherein said actuator is connected to said elongated rack for moving said elongated rack in a first direction which moves said first and second support rails toward one another and a second direction which moves said first and second support rails away from one another, said elongated rack including a first stop member rigidly affixed thereto for stopping movement of said elongated rack in said first direction, said stop mechanism further including a first gauge block removably attached to said stop mechanism and adapted to engage said first stop member to stop movement of said elongated rack in said first direction, said first gauge block being replaceable with other gauge blocks of varying size to vary the amount of travel between said support members by predetermined amounts.

47. The apparatus of claim 46 wherein said stop mechanism further includes a second gauge block removably attached thereto and said elongated rack includes a second stop member rigidly affixed thereto for stopping the movement of said rack in said second direction after a predetermined amount of movement.

48. The apparatus of claim 28 wherein said bar stock support members of said first support rail are disposed in staggered relation to said bar stock support members of said second support rail.

49. The apparatus of claim 28 further comprising a bar stock loading and unloading mechanism including at least two pivotally mounted levers extending transverse to said first and second support rails and operable to both load bar stock between said first and second support rails and unload bar stock from between said first and second support rails.

50. The apparatus of claim 49 wherein said levers are connected by a rod and said loading an unloading mechanism further comprises an actuator connected to one end of at least one of said levers for pivoting said levers in loading and unloading directions.

51. Bar stock feeding apparatus comprising:

first and second feed rollers respectively secured to first and second feed roller supports, said feed rollers thereby being equidistant from a longitudinal axis extending therebetween;

an actuating rack operatively connected to an actuator for moving said actuating rack back and forth, a gear system connected between said actuating rack and said feed roller supports for translating back and forth movement of said actuating rack into inward and outward movement of said feed roller supports with respect to each other while maintaining said feed rollers equidistant from said longitudinal axis, a drive for rotating at least one of said feed rollers and moving said bar stock along said longitudinal axis when said feed rollers are in engagement with said bar stock.

52. The apparatus of claim 51 wherein said bar stock feeding mechanism includes at least a pair of feed rollers disposed on one side of said longitudinal axis and a pair of feed rollers disposed on an opposite side of said longitudinal axis, wherein a drive is operatively coupled to at least one roller in each pair of rollers for rotating said rollers in opposite directions.

53. The apparatus of claim 52 wherein a drive is operatively coupled to each roller of said pairs of rollers.

54. The apparatus of claim 51 wherein said gear system is a rack and pinion gear system.

55. The apparatus of claim 54 wherein said rack and pinion gear system includes a pinion rotatably mounted between first and second opposed racks, said first opposed rack being rigidly connected to said first feed roller support and said second opposed rack being rigidly connected to said second feed roller support and said pinion further being in engagement with said elongated rack.

56. The apparatus of claim 55 wherein said actuator further comprises at least one double acting cylinder and a source of fluid pressure for operating said double acting cylinder.

57. The apparatus of claim 56 further comprising a bar stock loading and unloading mechanism including at least two pivotally mounted levers extending transverse to said first and second feed rollers and operable to both load bar stock between said first and second feed rollers and unload bar stock from between said first and second feed rollers.

58. The apparatus of claim 57 wherein said levers are connected by a rod and said loading an unloading mechanism further comprises an actuator connected to one end of at least one of said levers for pivoting said levers in loading and unloading directions.

* * * * *